Nov. 24, 1953   E. R. BACKOFEN ET AL   2,660,325
INDUSTRIAL TRUCK

Filed July 21, 1950   5 Sheets-Sheet 1

INVENTORS.
E. RYAN BACKOFEN
ELMER J. DUNHAM
SIDNEY R. SKELLENGER
BY
ATTYS.

Nov. 24, 1953  E. R. BACKOFEN ET AL  2,660,325
INDUSTRIAL TRUCK

Filed July 21, 1950  5 Sheets-Sheet 2

INVENTORS.
E. RYAN BACKOFEN
ELMER J. DUNHAM
SIDNEY R. SKELLENGER
BY
ATTYS.

Nov. 24, 1953 E. R. BACKOFEN ET AL 2,660,325
INDUSTRIAL TRUCK
Filed July 21, 1950 5 Sheets-Sheet 4

INVENTORS.
E. RYAN BACKOFEN
ELMER J. DUNHAM
SIDNEY R. SKELLENGER
BY
ATTYS.

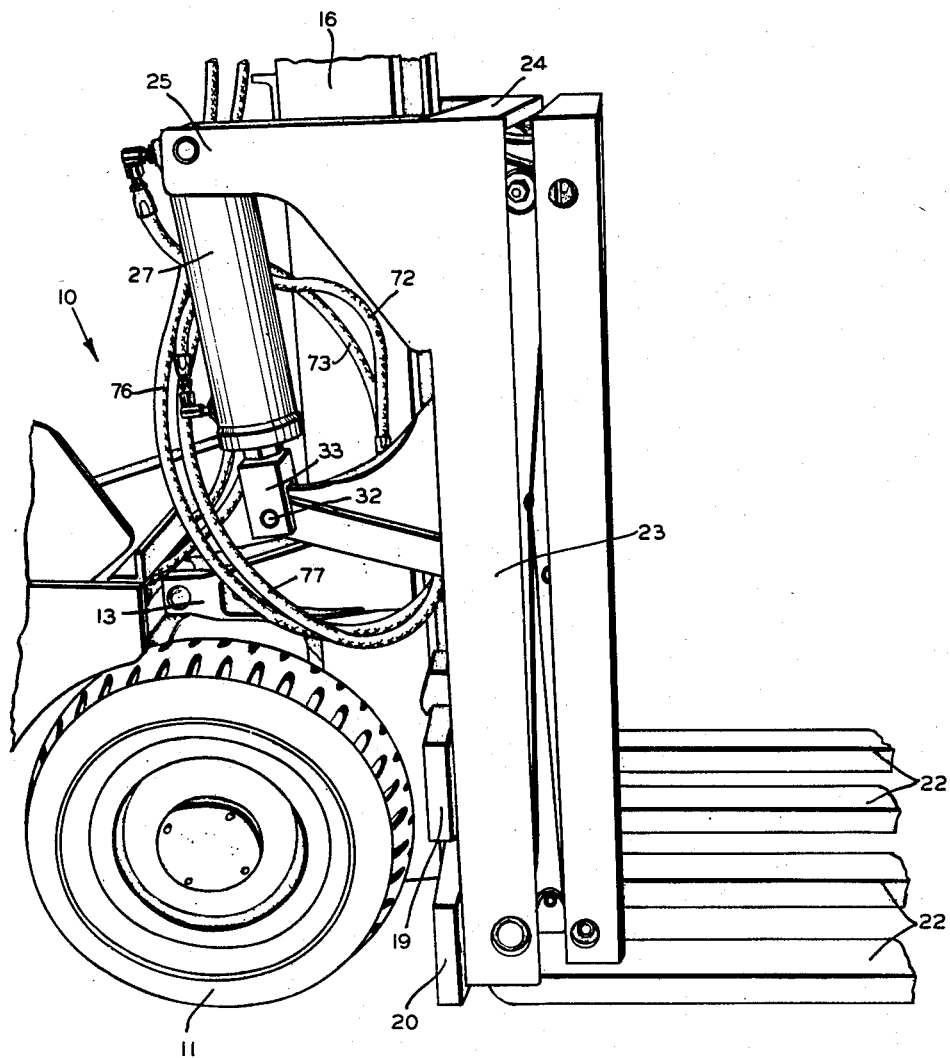

Patented Nov. 24, 1953

2,660,325

UNITED STATES PATENT OFFICE 2,660,325

INDUSTRIAL TRUCK

E. Ryan Backofen, Elmer J. Dunham, and Sidney R. Skellenger, Battle Creek, Mich., assignors to Clark Equipment Company, Buchanan, Mich., a corporation of Michigan Application July 21, 1950, Serial No. 175,264

12 Claims. (Cl. 214—514)

Our invention relates generally to industrial trucks and, more specifically, is directed to an industrial truck having load supporting means, as, for example, in the form of lift forks or an apron mounted on a load elevating and supporting carriage, and with which a mechanism is provided for pushing a load off of the load supporting means.

The present invention constitutes an improvement in industrial trucks disclosed in the copending, joint application of Elmer J. Dunham and Alfred Wayne Gunning, Serial No. 80,738, filed March 10, 1949, now Patent No. 2,601,931.

The mechanism of our present invention comprises primarily a vertically extending load engaging rack which is adapted for lengthwise movement with respect to horizontally extending load supporting means carried by the load supporting carriage of an industrial truck. The rack may be actuated through linkage means pivotally mounted between a vertical supporting member, carried by the load supporting carriage, and the load engaging rack under the influence of hydraulic piston and cylinder means connected to the linkage means for pushing a load off of the load supporting means. The linkage means of the pusher mechanism is capable of retraction to a folded position in juxtaposition of the supporting member, with the rack disposed closely adjacent to the heel of the load supporting means, and is further capable of expansion to a position beyond the forward extremity of the load supporting means.

It is an object of our present invention to provide linkage means, between the vertical supporting member and the load engaging rack, of a character which will maintain the load engaging rack parallel to the supporting member in any position of the load engaging rack.

It is another object of our present invention to provide a mechanism of this type which can be extended to its fully extended position with a relatively small stroke of a hydraulically actuated piston, and one which can be equally well retracted into a folded position adjacent to the rear end of the projecting load supporting means.

It is a still further object of our present invention to provide a construction of this type which is sturdy and non-cocking for preventing any binding of the pivotal connections or the like.

Now, in order to acquaint those skilled in the art with the manner of constructing and using the devices in accordance with the principles of our present invention, we shall describe in connection with the accompanying drawings a preferred embodiment of our invention.

In the drawings:

Figure 5 is a perspective view of the pusher mechanism in retracted position, as viewed from one side.

Figure 1:
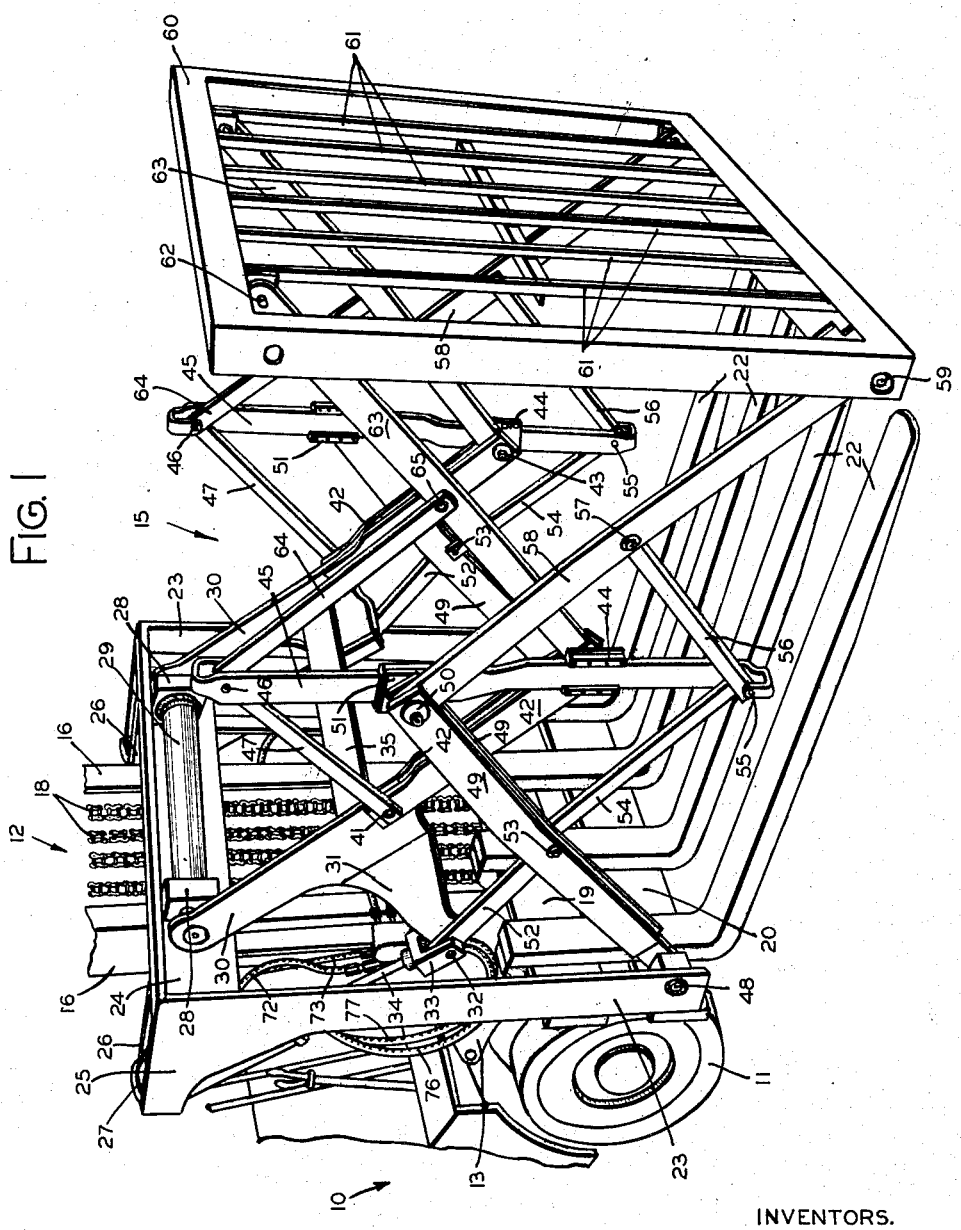
Figure 1 is a perspective view of the pusher mechanism of our present invention, looking diagonally toward an industrial truck to which it is secured.

Referring now to the drawings, there is shown the front portion of an industrial truck, indicated generally by the reference numeral 10, having a pair of forward driving wheels 11. The truck 10 adjacent its forward end is provided with a vertical mast 12, pivotally mounted for fore and aft tilting movement adjacent its lower end. The mast 12 has a bracket 13 suitably connected to a hydraulically controlled piston for effecting tilting movement thereof. The truck is provided with a power plant, such as an internal combustion engine, having pump means associated therewith for developing fluid under pressure, which is used not only for raising and lowering a load supporting carriage 14, guided for vertical movement within the mast 12, but also for actuating the tilting mechanism 13 and the pusher linkage means, indicated generally at 15.

The mast 12 is of conventional construction and preferably is formed of U-shaped channel members 16 and telescoping channel members, mounted for sliding movement therein, within which is slidably mounted the aforementioned load supporting carriage 14. The telescoping channel members, guided in the outer vertical U-shaped channel members 16, are raised and lowered by means of a hydraulic piston and cylinder assembly 17 mounted intermediate of the channel members 16. Suitable chain means 18, having connection adjacent their upper ends to the upper ends of the telescoping channel members are provided for raising and lowering the load supporting carriage 14 in a known manner.

Mounted to the forward vertical surface of the load supporting carriage 14 are a pair of vertically spaced frame members 19 and 20 which extend transversely of the industrial truck 10. Mounted to the upper edges of the upper transverse frame member 19, by means of inverted hook-shaped members 21, are a plurality of forwardly extending L-shaped load supporting forks 22. In place of the forks 22 a solid supporting apron may be employed or widened forks may be used for engaging a load to be carried by the truck 10. The particular type of load engaging means is not pertinent to the present invention and, therefore, the forks 22 are illustrated to show a conventional type of load engaging mechanism employed with trucks of this type.

Mounted to the forward vertical surfaces of the frame members 19 and 20, adjacent each side thereof, are vertically extending side frame members 23 which are interconnected adjacent their upper ends by means of a horizontally extending transverse angle frame member 24. The vertical frame members 23 are formed adjacent their upper ends with rearwardly extending portions 25. Disposed inwardly of each of the rearwardly extending portions 25, and secured to the rear surface of the horizontal transverse angle frame member 24, are a pair of bracket members 26. Pivotally mounted between the rear ends of the rearwardly extending portions 25 and the brackets 26 are the upper closed ends of a pair of angularly downwardly extending hydraulic piston and cylinder assemblies 27. The hydraulic piston and cylinder assemblies 27 are provided for effecting actuation of the pusher linkage mechanism 15.

Mounted within the confines of the horizontal transverse angle frame member 24 are a pair of spaced bearing blocks 28, in which are journaled the ends of a horizontally extending shaft 29. Fixed to the outer ends of the shaft 29, outwardly of the bearing blocks 28, are a pair of forwardly downwardly extending arm members 30 which are provided with laterally offset portions 31, pivotally mounted at their outer ends by pin members 32 between the arms of yoke members 33 suitably secured to the outer ends of the piston rods 34 of the aforedescribed hydraulic piston and cylinder assemblies 27.

The arm members 30 are interconnected, adjacent their outer ends, by means of a horizontal transverse brace member 35.

The outer ends of arm members 30 are each mounted, by pin members 41, between the one ends of a pair of link members 42. Each pair of link members 42 extend forwardly and downwardly, and adjacent their lower ends are pivotally mounted by pin members 43 to shoe members 44, slidingly mounted on the lower portions of vertically extending guide frame members 45. The upper ends of the guide frame members 45 are bent over, and pivotally mounted therebetween by pin members 46 are the one ends of link members 47, which, at their other ends, are pivotally mounted, about the pin members 41, to the outer ends of the aforementioned arm members 30.

Pivotally mounted about pin members 48, adjacent the lower ends of each of the vertically extending side frame members 23, are pairs of forwardly upwardly extending arm members 49. Each pair of arm members 49, adjacent their upper ends, are pivotally mounted about pin members 50 to shoe members 51, slidingly mounted on the upper portions of the aforedescribed vertical guide frame members 45.

Pivotally mounted between the arms of the yoke members 33, at the outer ends of piston rods 34, are the one ends of link members 52 which, at their other ends, are pivotally mounted, about pin members 53, between each pair of arm members 49, intermediate of the ends thereof. Pivotally mounted about the pin members 53, inwardly of the pairs of arm members 49, are link members 54 which extend forwardly and downwardly, and are pivotally mounted, adjacent their lower ends, about pin members 55, to the lower upturned portions of the vertical guide frame members 45.

Pivotally mounted at their one ends, about pins 50, between each pair of arm members 49, are a pair of forwardly and downwardly extending arm members 58. The arm members 58, at their lower ends, are pivotally mounted about pins 59, to the sides of a vertically extending rectangular load engaging rack 60, which extends transversely of the industrial truck 10. A pair of link members 56 are pivotally mounted, at their one ends, about pins 55 and at their other ends are pivotally mounted, about pins 57, to the arm members 58, intermediate of the ends thereof.

A plurality of horizontally spaced vertically extending strut or brace members 61 are suitably secured at their upper and lower ends to the upper and lower portions of the load engaging rack 60. Pivotally mounted to the outermost struts 61, adjacent the upper end thereof, about pin members 62, are the upper ends of a pair of rearwardly downwardly extending arm members 63. The arm members 63, adjacent their lower ends, are pivotally mounted about the pin members 43 between each pair of link members 42. A pair of link members 64 are pivotally mounted adjacent their one ends, about pin members 65, to the arm members 63, intermediate of the ends thereof, and at their other ends are pivotally mounted about the pin members 46, adjacent the upper ends of the vertically extending guide frame members 45.

The upper and lower ends of the hydraulic piston and cylinder assemblies 27 have connection with a terminal block 71 through a pair of hose lines 72 and 73, respectively. Fluid under pressure is transmitted to the terminal block 71 from a hydraulic fluid pump (not shown), through a pair of hose lines 76 and 77.

Figure 2:
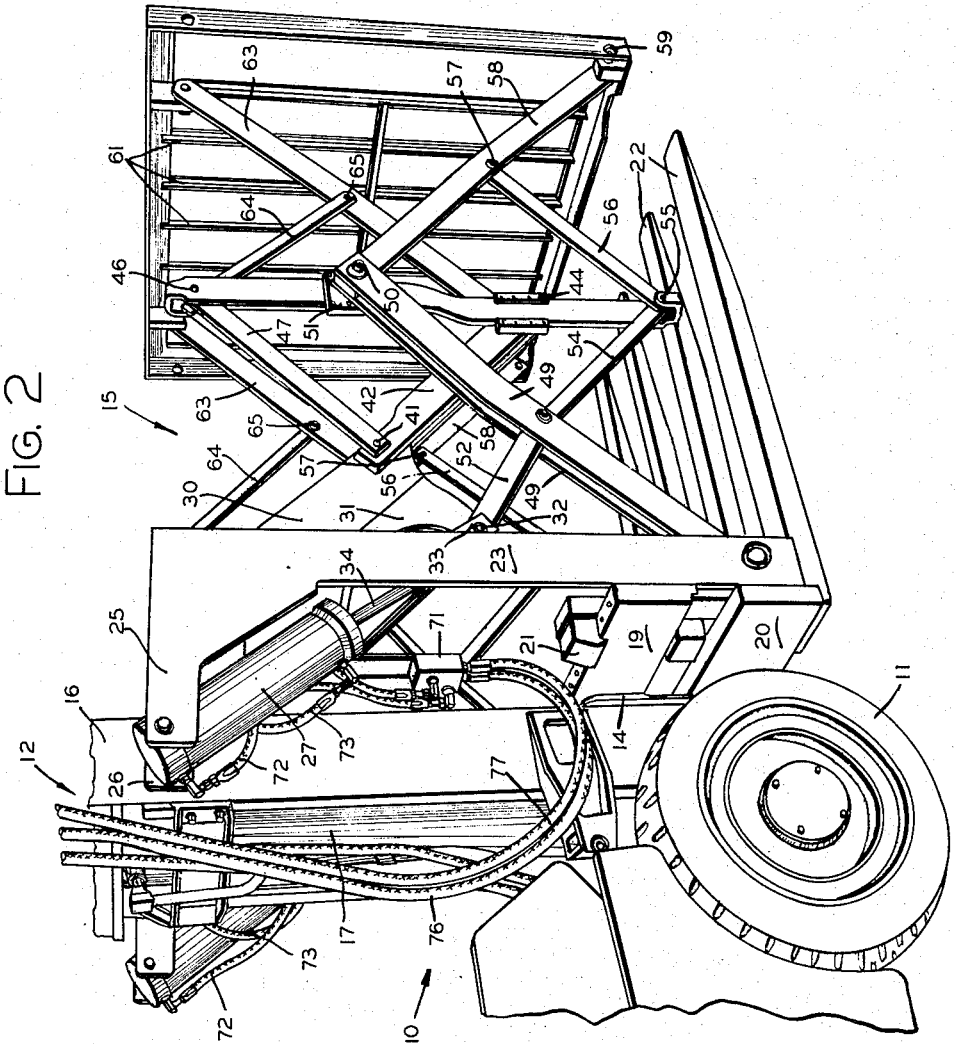
Figure 2 is a perspective view of the pusher mechanism of Figure 1, looking diagonally away from the industrial truck to which it is secured.
Figure 3:
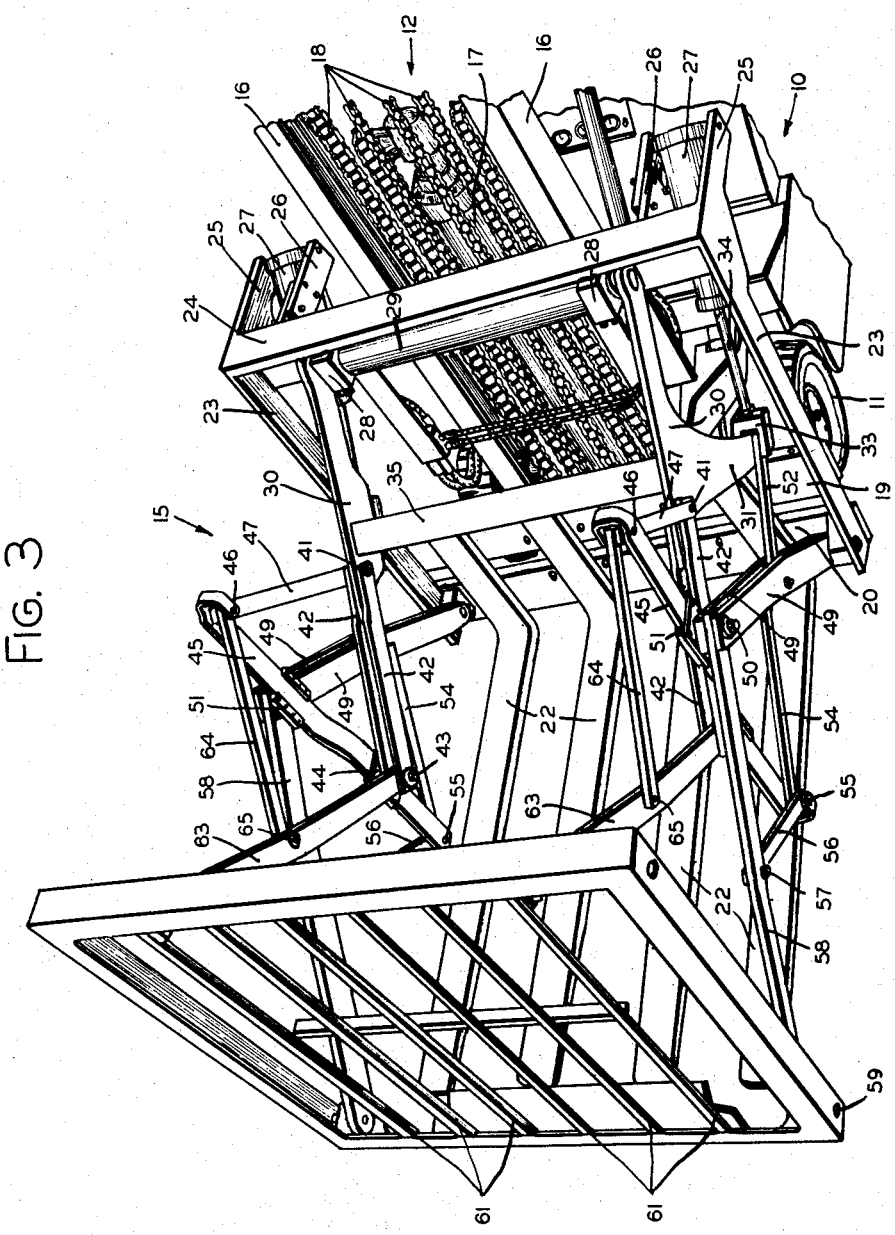
Figure 3 is a perspective view of the pusher mechanism of Figure 1, looking diagonally downwardly.

When the load engaging rack 60 and the linkage mechanism 15 are in the position shown in Figures 1 through 3, and fluid under pressure is admitted through fluid lines 73 to the lower ends of the cylinders of the hydraulic piston and cylinder assemblies 27, the piston rods 34 are retracted thereby causing the arm members 30 to rotate clockwise about the shaft 29. Clockwise rotation of the arm members 30 causes the pairs of link members 42 to urge the shoe members 44 downwardly on the vertically extending guide frame members 45. Retraction of the piston rods 34 also causes the link members 52 to urge the pairs of arm members 49 to rotate counterclockwise about pin members 48. Counterclockwise rotation of the pairs of arm members 49 causes the shoe members 51 to be urged upwardly on the vertical guide frame members 45. Upward movement of the shoe members 51, together with downward movement of the shoe members 44, causes the vertical guide frame members 45 to be moved toward the vertical side frame members 23. Upward movement of the shoe members 51 causes the arm members 58 to rotate clockwise about pin members 59, thereby urging the lower portions of the vertically extending load engaging rack 60 toward the vertical guide frame members 45. Downward movement of the shoe members 44 causes the arm members 63 to rotate counterclockwise about pin members 62, thereby urging the upper portions of the load engaging rack 60 to move toward the vertical guide frame members 45.

Figure 4:
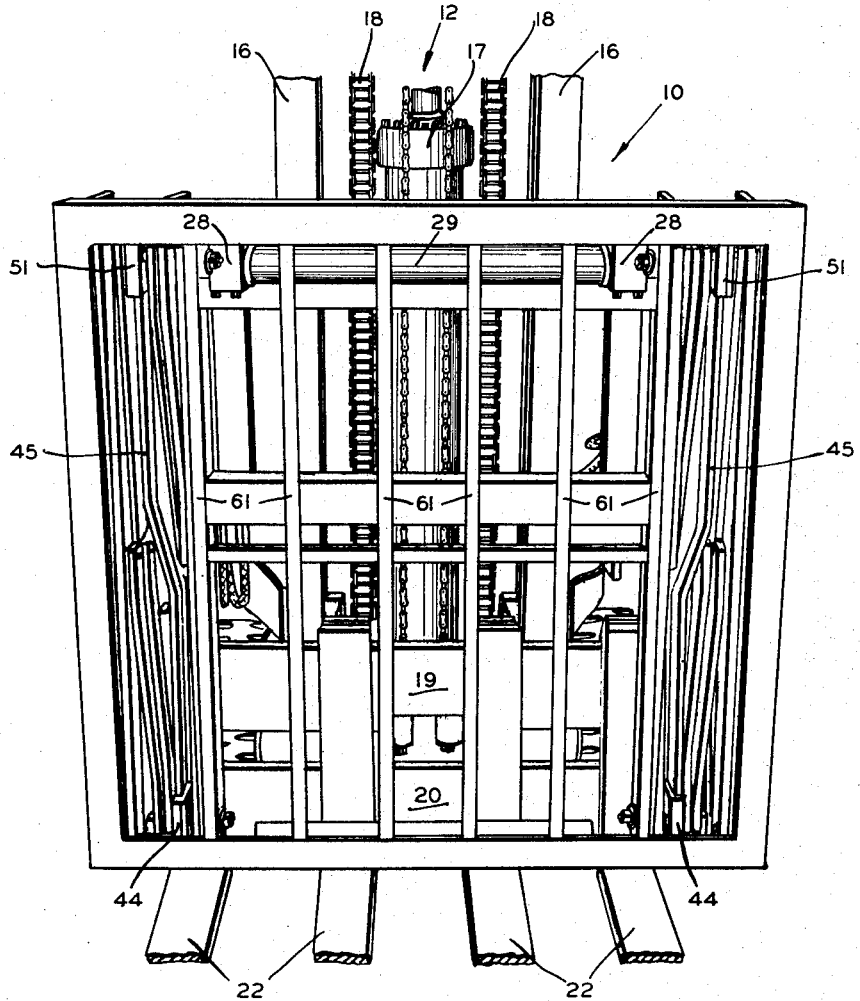
Figure 4 is a perspective view of the pusher mechanism in retracted position, as viewed from the front.

It will be understood that downward movement of shoe members 44, upward movement of shoe members 51, clockwise rotation of arm members 30 and arm members 58, together with counterclockwise rotation of the pairs of arm members 49 and the arm members 63, takes place simultaneously. When the piston rod 34 is in its fully retracted position, as shown in Figures 4 and 5, the vertical guide frame members 45 are disposed substantially within the confines of the vertical side frame members 23 and the load engaging rack 60 is disposed adjacent to the forward edges of the side frame members 23.

The industrial truck 10 may then be maneuvered into a position with the forks 22 disposed beneath a pallet supported load, after which the forks 22 may be raised, together with the pallet and load, and the truck 10 driven to the desired location where the load is to be deposited.

While fluid under pressure is admitted to the upper ends of the hydraulic piston and cylinder assemblies 27, through the hose lines 72, the truck 10 is simultaneously backed away. Fluid under pressure, admitted to the hydraulic piston and cylinder assemblies 27, causes the piston rods 34 to be extended, thereby causing the arm members 30 to rotate counterclockwise which causes the shoe members 44 to be urged upwardly on the vertical guide frame members 45. When the piston rods 34 are extended the link members 42 are caused to urge the pairs of arm members 49 to rotate clockwise about pin members 43, thereby causing shoe members 51 to be urged downwardly on the vertical guide frame members 45. Downward movement of the shoe members 51 and upward movement of the shoe members 44 causes the vertical guide frame members 45 to be moved away from the vertical side frame members 23. Downward movement of the shoe members 51 also causes arm members 58 to rotate counterclockwise about pin members 59, thereby extending the lower portion of the load engaging rack 60. Upward movement of shoe members 44 causes the arm members 63 to rotate clockwise about pin members 62, thereby extending the upper portion of the load engaging rack 60. After the piston rods 34 have been fully extended the load engaging rack 60, together with the linkage mechanism 15, assumes the position shown in Figures 1 through 3.

Small movement of the piston rods 34 produces, through the aforedescribed linkage arrangement, a relatively large movement of the load engaging rack 60, thus providing for rapid extension and retraction of the latter.

With the provision of the link members 47, 54, 56, and 64 the load engaging rack 60 is prevented from tilting rearwardly when the upper portion of the rack 60 is engaged with a load to a greater extent than the lower portion of the rack. The link members 47, 54, 56, and 64 are also provided for supporting the guide frame members 45 during movement toward and away from the side frame members 25.

While we have shown and described what we believe to be a preferred embodiment of our present invention, it will be understood that various modifications and rearrangements may be made therein without departing from the spirit and scope of our invention.

We claim:

1. A pusher mechanism for an industrial truck having a load supporting carriage including load supporting means extending forwardly of the truck comprising, a supporting frame adapted to be mounted on said carriage to extend transversely of and at the inner end of said load supporting means, a vertical load engaging rack extending transversely of said load supporting means, first arm means pivotally mounted at one end adjacent the upper end of said supporting frame, second arm means pivotally mounted at one end adjacent the upper end of said rack, first shoe means, said first and second arm means extending downwardly toward each other and being pivotally connected adjacent their other ends to said first shoe means, third arm means pivotally mounted at one end adjacent the lower end of said supporting frame, fourth arm means pivotally mounted at one end adjacent the lower end of said rack, second shoe means, said third and fourth arm means extending upwardly toward each other and being pivotally connected adjacent their other ends to said second shoe means, said first and second shoe means being slidably mounted on substantially vertically extending guide frame means, and means for pivoting said first arm means whereby said rack is extended and retracted over said load supporting means.

2. The combination of claim 1 wherein said last named means comprises fluid pressure actuated means carried by said supporting frame.

3. The combination of claim 1 including link means between said first arm means and said guide frame means and between said second arm means and said guide frame means.

4. The combination of claim 3 including link means between said third arm means and said guide frame means and between said fourth arm means and said guide frame means.

5. The combination of claim 1 including link means between said third arm means and said guide frame means and between said fourth arm means and said guide frame means.

6. A pusher mechanism for an industrial truck having a load supporting carriage including load supporting means extending forwardly of the truck comprising, a supporting frame adapted to be mounted on said carriage to extend transversely of and at the inner end of said load supporting means, a vertical load engaging rack extending transversely of said load supporting means, a horizontal shaft carried by said supporting frame adjacent the upper end thereof, first arm means mounted at one end on said shaft, second arm means pivotally mounted at one end adjacent the upper end of said rack, first shoe means, said first and second arm means extending downwardly toward each other and being pivotally connected adjacent their other ends to said first shoe means, third arm means pivotally mounted at one end adjacent the lower end of said supporting frame, fourth arm means pivotally mounted at one end adjacent the lower end of said rack, second shoe means, said third and fourth arm means extending upwardly toward each other and being pivotally connected adjacent their other ends to said second shoe means, said first and second shoe means being slidably mounted on substantially vertically extending guide frame means, and means for pivoting said first arm means whereby said rack is extended and retracted over said load supporting means.

7. The combination of claim 6 wherein said last named means comprises fluid pressure actuated means carried by said supporting frame.

8. The combination of claim 6 including link means between said first arm means and said guide frame means and between said second arm means and said guide frame means.

9. The combination of claim 8 including link means between said third arm means and said guide frame means and between said fourth arm means and said guide frame means.

10. The combination of claim 6 including link means between said third arm means and said guide frame means and between said fourth arm means and said guide frame means.

11. A pusher mechanism for an industrial truck having a load supporting carriage including load supporting means extending forwardly of the truck comprising, a supporting frame adapted to be mounted on said carriage to extend transversely of and at the inner end of said load supporting means, a vertical load engaging rack extending transversely of said load supporting means, a horizontal shaft carried by said supporting frame adjacent the upper end thereof, first arm means mounted at one end on said shaft, second arm means pivotally mounted at one end adjacent the upper end of said rack, first shoe means, said first and second arm means extending downwardly toward each other and being pivotally connected adjacent their other ends to said first shoe means, third arm means pivotally mounted at one end adjacent the lower end of said supporting frame, fourth arm means pivotally mounted at one end adjacent the lower end of said rack, second shoe means, said third and fourth arm means extending upwardly toward each other and being pivotally connected adjacent their other ends to said second shoe means, said first and second shoe means being slidably mounted on substantially vertically extending guide frame means respectively at the lower and upper portions thereof, first link means pivotally mounted at one end to said first arm means intermediate of the ends thereof and pivotally mounted at the other end to the upper end of said guide frame means, second link means pivotally mounted at one end to said second arm means intermediate of the ends thereof and pivotally mounted at the other end to the upper end of said guide frame means, third link means pivotally mounted at one end to said third arm means intermediate of the ends thereof and pivotally mounted at the other end to the lower end of said guide frame means, fourth link means pivotally mounted at one end to said fourth arm means intermediate of the ends thereof and pivotally mounted at the other end to the lower end of said guide frame means, said first arm means having laterally extending leg means, fifth link means pivotally mounted at one end to said leg means and pivotally mounted at the other end to said third arm means intermediate of the ends thereof, and means having connection with said leg means for pivoting said first arm means whereby said rack is extended and retracted over said load supporting means.

12. The combination of claim 11 wherein said last named means comprises hydraulic piston and cylinder means carried by said supporting frame.

E. RYAN BACKOFEN.
ELMER J. DUNHAM.
SIDNEY R. SKELLENGER.

References Cited in the file of this patent

UNITED STATES PATENTS

| Number | Name | Date |
|---|---|---|
| 513,553 | Blakely et al. | Jan. 30, 1894 |
| 1,977,785 | Wheelock | Oct. 23, 1934 |
| 2,176,636 | Meacham | Oct. 17, 1939 |
| 2,496,039 | Crawford | Jan. 31, 1950 |
| 2,601,931 | Dunham et al. | July 1, 1952 |

FOREIGN PATENTS

| Number | Country | Date |
|---|---|---|
| 474,968 | Germany | Apr. 17, 1929 |
| 323,812 | Italy | Jan. 9, 1935 |